United States Patent [19]

Demke et al.

[11] 4,410,958
[45] Oct. 18, 1983

[54] DISPLAYING A PROPORTIONALLY OUTLINED MINIATURE PAGE

[75] Inventors: Kent R. Demke; Joanne L. Mumola, both of Austin, both of Tex.

[73] Assignee: International Business Machines Corporation, Armonk, N.Y.

[21] Appl. No.: 219,683

[22] Filed: Dec. 24, 1980

[51] Int. Cl.³ .............................................. G06F 3/14
[52] U.S. Cl. .................................... 364/900; 340/721
[58] Field of Search ................... 364/900 MS File, ; 340/721

[56] References Cited

U.S. PATENT DOCUMENTS

| | | | |
|---|---|---|---|
| 4,107,664 | 8/1978 | Marino | 340/731 |
| 4,168,489 | 9/1979 | Ervin | 340/731 R |
| 4,223,393 | 9/1980 | Abe et al. | 364/900 |
| 4,340,888 | 7/1982 | Seroskie | 340/721 X |

OTHER PUBLICATIONS

Webb, G. T., "Combination of Alphanumeric and Formatting Data on CRT Display," *IBM T.D.B,* vol. 15, No. 7, Dec. 1972, p. 2146.

Bringol, C. R., "Abbreviated Character Font Display," *IBM T.D.B.,* vol. 19, No. 9, Feb. 1977, pp. 3248–3249.

*Primary Examiner*—Raulfe B. Zache
*Attorney, Agent, or Firm*—Andrea P. Bryant

[57] ABSTRACT

There is disclosed a technique for displaying on a relatively small CRT display, using less than the entire screen, a representation of a full page of text. The full page is represented using character indicators rather than recognizable characters. The full page representation is surrounded by an outline generated using the same character indicators as the formatted text representation rather than known graphic symbols. The outline is proportional to the ultimate hardcopy indicated by the user, and character indicators can be displayed right up to the page outlines.

10 Claims, 9 Drawing Figures

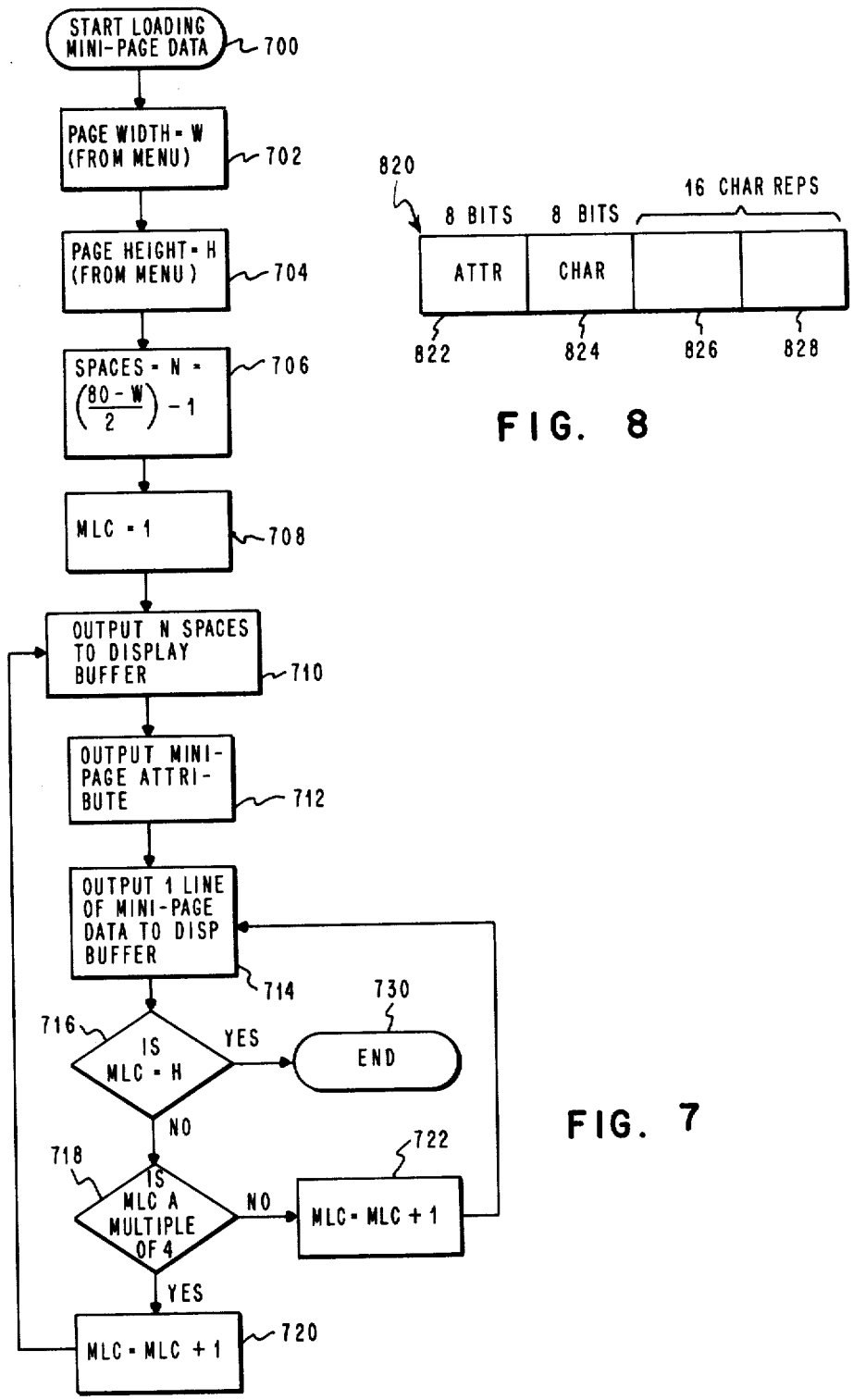

DISPLAYING A PROPORTIONALLY OUTLINED MINIATURE PAGE

DESCRIPTION

CROSS-REFERENCES TO RELATED APPLICATIONS

U.S. patent application Ser. No. 219,668, filed Dec. 24, 1980, entitled "Interactive Combination Display", and having K. R. Demke and J. L. Mumola as inventors.

U.S. patent application Ser. No. 219,666, filed Dec. 24, 1980, entitled "Displaying A Full Page Representation", and having K. R. Demke and J. L. Mumola as inventors.

BACKGROUND OF THE INVENTION

1. Field of the Invention

This invention relates to word processing systems including a display screen. In particular it relates to displaying on less than the entire screen a representation of a full page of text properly formatted and outlined to allow the user to comprehend the spatial relationship of text to page boundaries.

2. Description of the Prior Art

In word processing systems with a display for displaying text as it is entered and edited, an operator is usually unable to display an entire page because of the size of the screen. Often times, however, seeing the entire page is desirable as it enables the operator to appreciate the proper spatial relationship of the text to the page boundaries.

One prior art technique for solving this problem is described in U.S. Pat. No. 4,168,489 wherein the actual text characters are compressed for the miniature format display. The height of each character is reduced by utilizing only certain of the rows of vertical dots. Horizontal reduction is accomplished by means of a circuit which decreases the current flowing through the horizontal winding of the cathode ray tube deflection yoke. The lessened current compresses the image width on the visual display screen. That patent also discusses other prior art techniques for reducing a page of text to fit within the confines of a partial page word processing system and points out why they are inappropriate. This reference teaches reduction of a page to about one-third its size so as to effectively fill the viewing area of the display. That is, a full page of text is displayed using characters reduced in both the horizontal and vertical dimensions by two-thirds. Not all of the compressed characters are legible. Normal word processing functions can be performed, however.

Another approach can be found in IBM *Technical Disclosure Bulletin* "Abbreviated Character Font Display", Volume 19, No. 9, February 1977, page 3248. That author discloses a technique for displaying significant shapes of characters, words and phrases to allow an operator the ability to quickly access a particular portion of the page without actually reading displayed text.

A different approach is illustrated in IBM *Technical Disclosure Bulletin* article "Combination of Alphanumeric and Formatting Data on the CRT display", Volume 15, No. 7, December 1972, page 2136. A single dot is used to represent each normally 5×7 dot character. In this technique, the operator can see several lines of text in normal size as well as the total unit of text as represented by dots only. The active window area of the dot only portion of the display is intensified so that the operator can perceive the format relationship of the active text to the entire text. This active window may be moved at the operator's discretion.

U.S. Pat. No. 4,107,664 relates to raster scanned display systems in which character size is enlarged in the horizontal dimension by increasing the number of times each dot is sequentially displayed.

None of the above references relates to displaying an outline around the reduced size image with the outline directly proportional to the actual page size. It is known, however, to use graphic font symbols to provide outlines but these font symbols are fixed in size.

The problem of lack of proportionality in a page outline addressed by the present invention has not arisen previously, as best known, because there has been no combination on the same line of standard graphic symbols and miniature character representations. Were it desired to outline a page representation comprised of miniature character indicators with an outline of standard graphic symbols the result would not be satisfactory because the graphic symbols would be generated in character boxes of a fixed size which would preclude proportionality which would preclude displaying character representations up to the page outlines.

OBJECTS OF THE INVENTION

It is, therefore, an object of the present invention to overcome the shortcomings of the prior art and provide proportionally outlined representations of a full page of text on a video display of a word processing system.

It is a further object of the invention to outline a full page representation on less than an entire screen using one matrix construct to represent both character and outline symbols.

SUMMARY OF THE INVENTION

These and other objects are accomplished using a technique by which a normally 8×16 character box character is represented in the display buffer as a single bit and displayed as a 2×4 dot matrix construct. The same construct is used to generate a page outline proportional to the size of the desired hard copy output. Character representation symbols are included at the beginning and end of lines of miniature text representations to form vertical portions of the outline. By using only miniature character representations for both text and page outlines proportionality is achieved, and text can be displayed right up to the page outlines.

BRIEF DESCRIPTION OF THE DRAWINGS

These and other features and advantages will become more clear in connection with the following detailed description of a preferred embodiment taken with reference to the accompanying drawings wherein:

FIG. 7 illustrates the operation of the invention.
FIG. 8 represents a portion of memory 18 of FIG. 1.

DESCRIPTION OF THE PREFERRED EMBODIMENT

Figure 1:
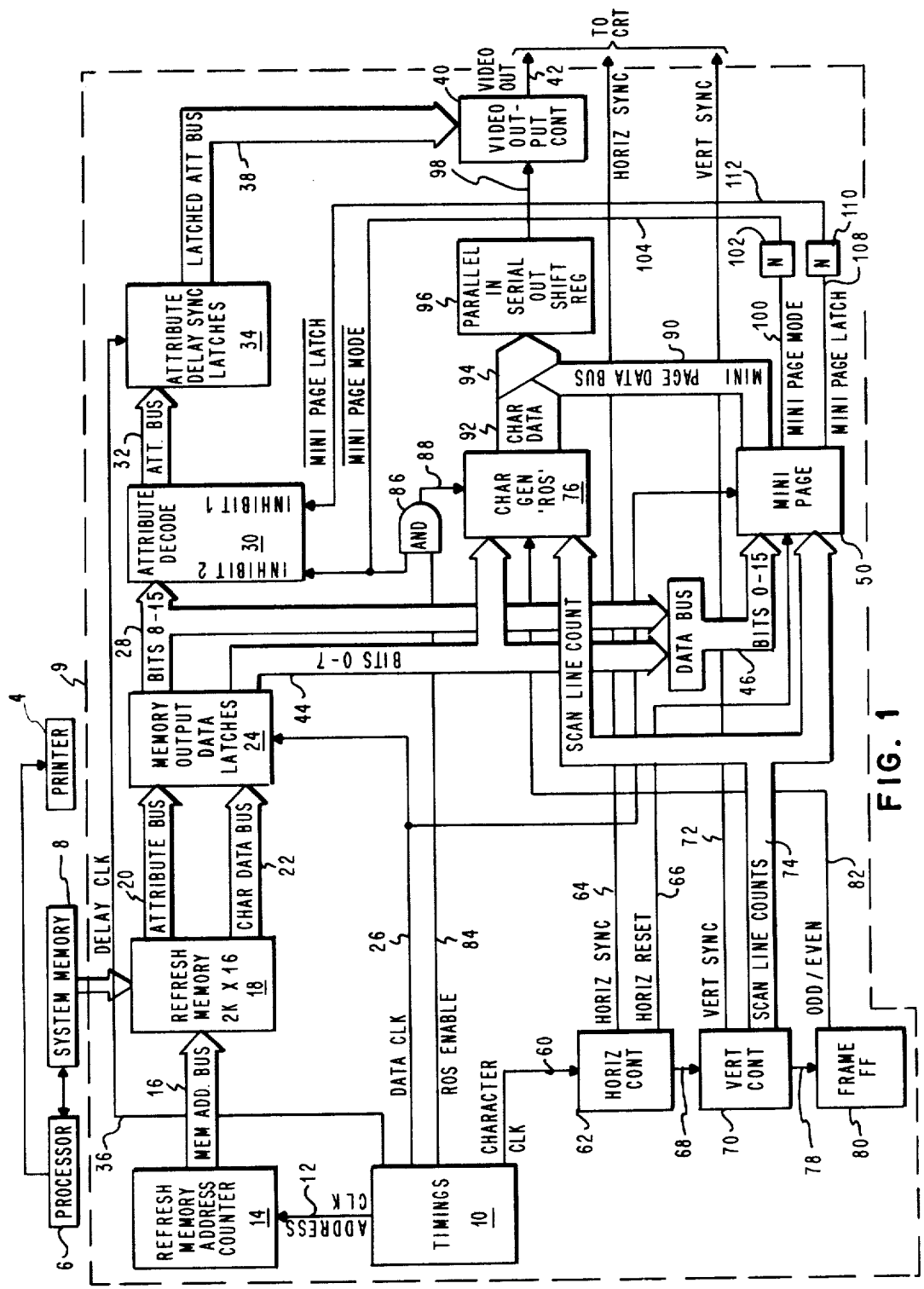
FIG. 1 is a block diagram of a word processing system in which our invention is embodied.

FIG. 1 is a block diagram of a typical implementation of a word processing system in which our invention is embodied. The illustrated system includes processor 6, main memory 8, a display, printer 4 and display interface logic 9. Only those connections between processor 6, main memory 8, and display interface logic 9 are shown as needed for purposes of explanation of our invention. Other interconnections therebetween are conventional and well understood by those skilled in the art.

Figure 9:
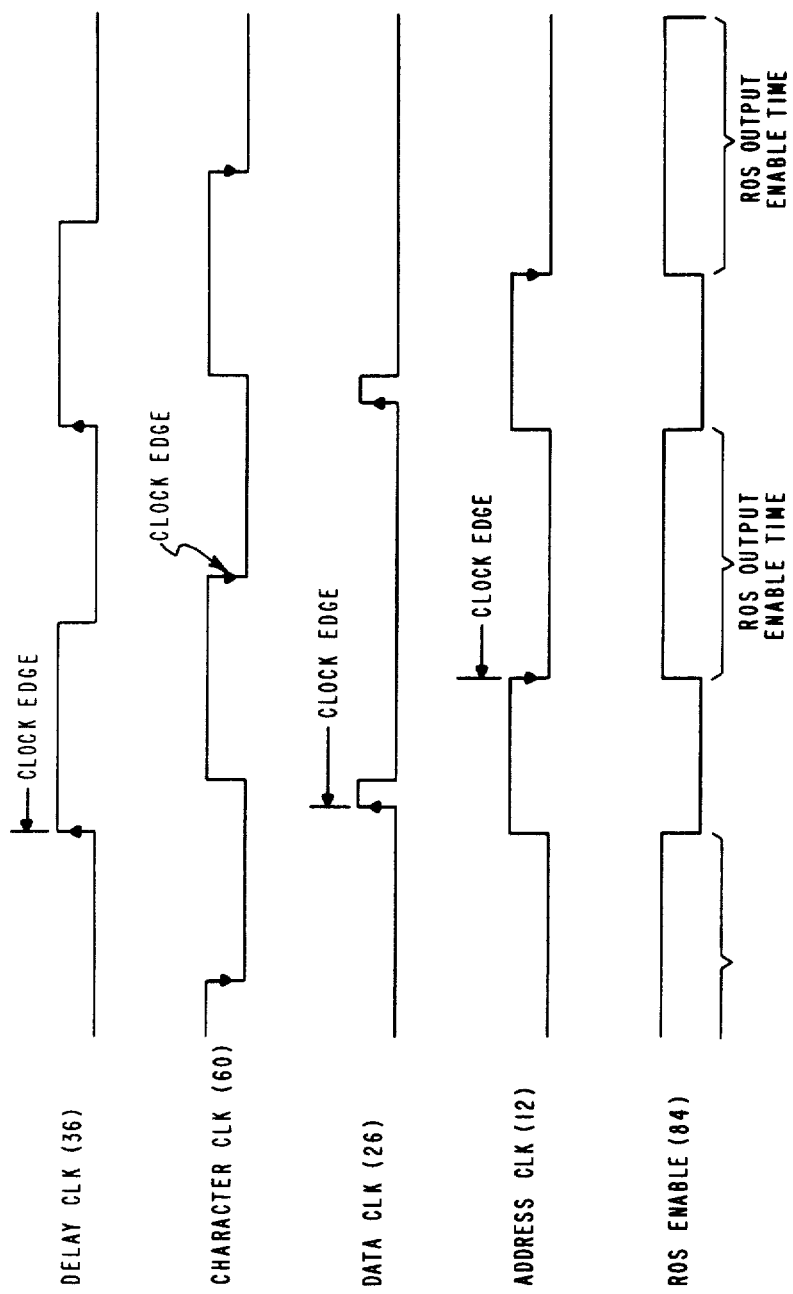
FIG. 9 shows the timing relationship of signals output from timing generator 10 of FIG. 1.

Timing generator block 10 provides various clocking signals for the word processing system illustrated. The wave forms of the signals output by timing generator 10 are illustrated in FIG. 9. The address clock signal on line 12 is input to refresh memory address counter 14 whose output appears on memory address bus 16. The address on bus 16 is input to the refresh memory 18. Attribute bus 20, as well as character data bus 22, are two outputs from refresh memory 18. The data on both 20 and 22 are latched into memory output data latches 24. Another clock signal from timing generator block 10 is the data clock on line 26 which is input to data latches 24 for controlling input thereto. Eight bits on bus 28 are output from latches 24 to attribute decoder 30. Once decoded, attribute data is output on bus 32 and is input to attribute delay synchronization latches 34 under control of delay clock signals on line 36. The latched attribute data is output on bus 38 to video output control 40, the output of which on line 42 is the video input to the CRT monitor (not shown).

The other eight bits of character data are output from memory output data latches 24 along bus 44. The total 16 bits of character information from latches 24 on the two buses 28 and 44 are joined in data bus 46 prior to being input to miniature page generator 50. Miniature page generator 50 also receives from timing generator 10 data clocking signals along line 26.

The character clock signal on line 60 is also output from timing generator 10. Character clock signals on line 60 are input to horizontal control 62 which generates horizontal synchronization signals on line 64 which is one input to the CRT monitor (not shown). Also generated in horizontal control 62 are horizontal reset signals on line 66. Horizontal reset signals on line 66 are input to miniature page generator 50 for reasons which will become clear as this description progresses. Vertical clock signals are generated in horizontal control 62 and are passed along line 68 to vertical control 70. Vertical control 70, in a conventional manner, generates vertical synchronization signals along line 72 for input to the CRT monitor. Vertical control 70 also generates counts of scan lines displayed on bus 74. Scan line count bus 74 is input to both miniature page generator 50, for purposes which will subsequently become clear, and to character generator storage 76. Vertical control 70 generates frame clock signals on line 78 which are input to frame flip-flop 80. Frame flip-flop 80 generates odd-/even signals indicative of frame status in interlaced scanning terms and passes them along line 82 to character generator storage 76.

Character generator storage 76 also has an input from bus 44. Timing generator 10 generates the character generator storage enable signal along line 84 which is gated through AND gate 86. The signal arising in AND gate 86 passes along line 88 to character generator storage 76.

Miniature page generator 50 has three outputs. The first is the miniature page data bus 90 which is DOT-OR'D with the character data bus 92 from character generator 76. Either bus 90 or bus 92 data, as will become clear, is on bus 94 which is input to parallel to serial shift register 96. Serial data is output on line 98 to video output control 40. Another output from miniature page generator 50 is the miniature page mode signal on line 100 which is inverted by inverter 102. The inverted value on line 104 is an input to both attribute decode logic 30 as well as to AND gate 86. The final output of miniature page generator 50 is the miniature page latch signal on line 108 which is inverted by inverter 110. The inverted value of the miniature page latch signal on line 112 is the other input to the attribute decode 30.

Miniature page generator 50 is a key element of the system in which the present invention is implemented. Miniature page data to be displayed on the screen is written into refresh memory 18 using conventional write operations which form no part of the present invention. Once an operator has indicated to a system employing our invention a desire to display a miniature representation of a page, conventional techniques are used to read characters from the main memory 8 and to store "1"s for characters and "0"s for spaces in groups of 16 bits in display refresh memory 18.

Figure 2:
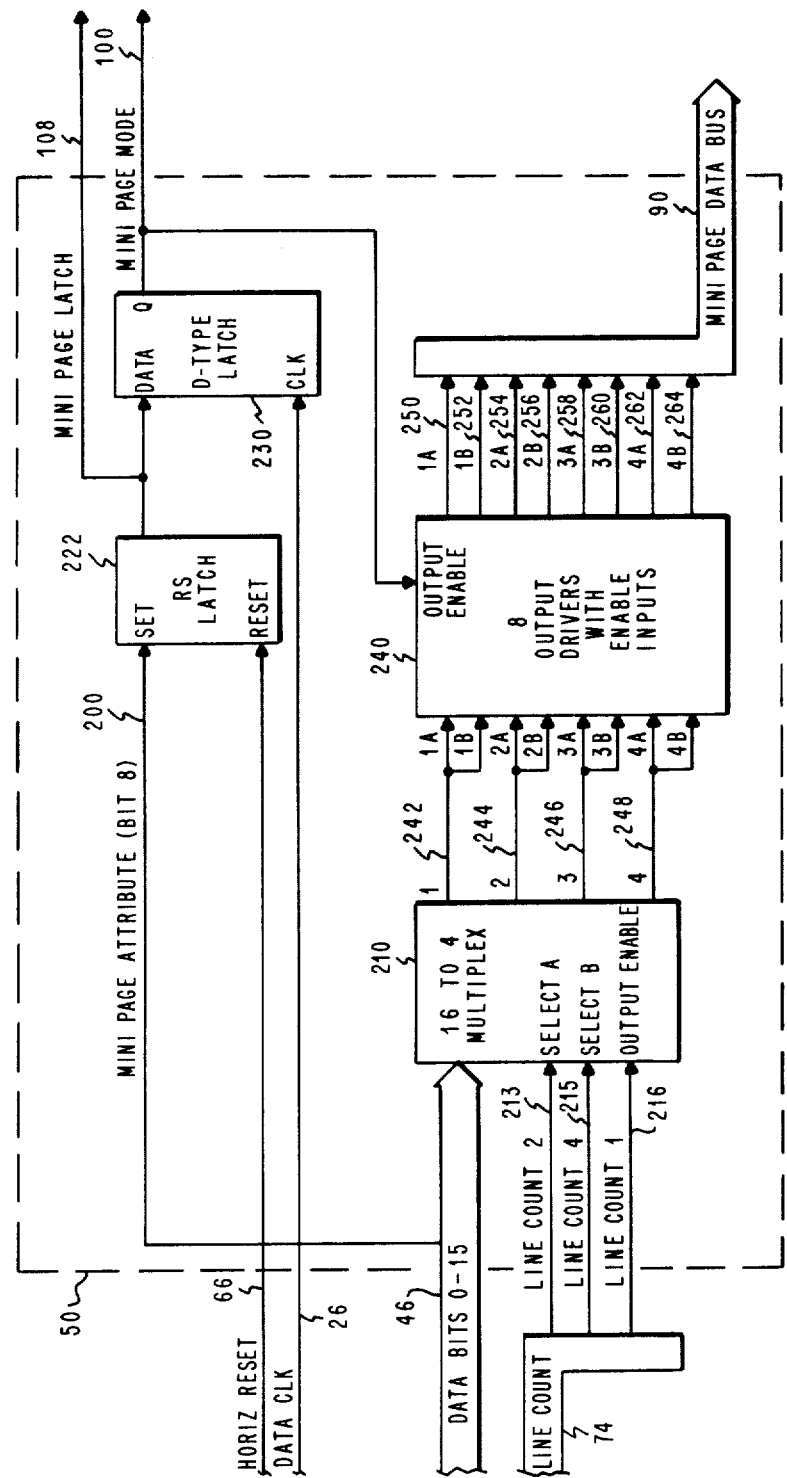
FIG. 2 shows more detail of miniature page generator 50 of FIG. 1.

Referring now to FIG. 2, internal logic of miniature page generator 50 is shown in a greater level of detail. One of 16 data bits on bus 46, bit 8, is the miniature page attribute and is placed on line 200 to set RS latch 222. The reset input for RS latch 222 is provided by horizontal reset signal on line 66. The output of RS latch 222 is the miniature page latch signal on line 108 which, as will be recalled, is inverted and then used as an inhibit input to attribute decode logic 30 of FIG. 1. Line 108 is also the data input to D Type latch 230. The clock input to latch 230 is the data clock signal on line 26. The output of D latch 230 is the miniature page mode signal on line 100 which, after inversion, is applied as the other inhibit input to attribute decode 30 in FIG. 1.

Bus 46, carrying 16 bits of data, is applied to 16 to 4 multiplexer 210. Multiplexer 210 is provided to divide the 16 data bits on bus 46 into four groups of four. Scan line counts 2 and 4 on lines 213 and 215, respectively, are taken from scan line count bus 74. Scan line count 2 provides a Select A input and scan line count 4 the Select B input to multiplexer 210. The particular four bits taken from bus 46 are a function of the states of scan line counts 2 and 4. Scan line count 1 on line 216 is the output enable signal for multiplexer 210.

Each group of four bits is broken down one bit each on lines 242, 244, 246, and 248, respectively, on output from multiplexer 210. These lines, 242, 244, 246, and 248, are fanned out so that each one provides two inputs to a block of eight output drivers 240. When the miniature page mode indicator on line 100 is up, it enables output from the eight output drivers comprising block 240. The two bits derived from the one bit on line 242 are output on lines 250 and 252. Similarly, the two bits from line 244 are output on 254 and 256, the two from line 246 on lines 258, 260, the two from line 248 on lines 262 and 264. These eight bits make one parallel word or byte of data on miniature page data bus 90 which provides an input to parallel to serial converter 96 in FIG. 1.

The serial output from shift register 96 in FIG. 1 is provided to video output control 40 in the conventional manner for display on the CRT. Thus, the single bit stored in refresh memory 18 as a result of examining the data in the system main memory is changed to double dots in a 2×4 character box for output in the miniature page mode.

Figure 3:
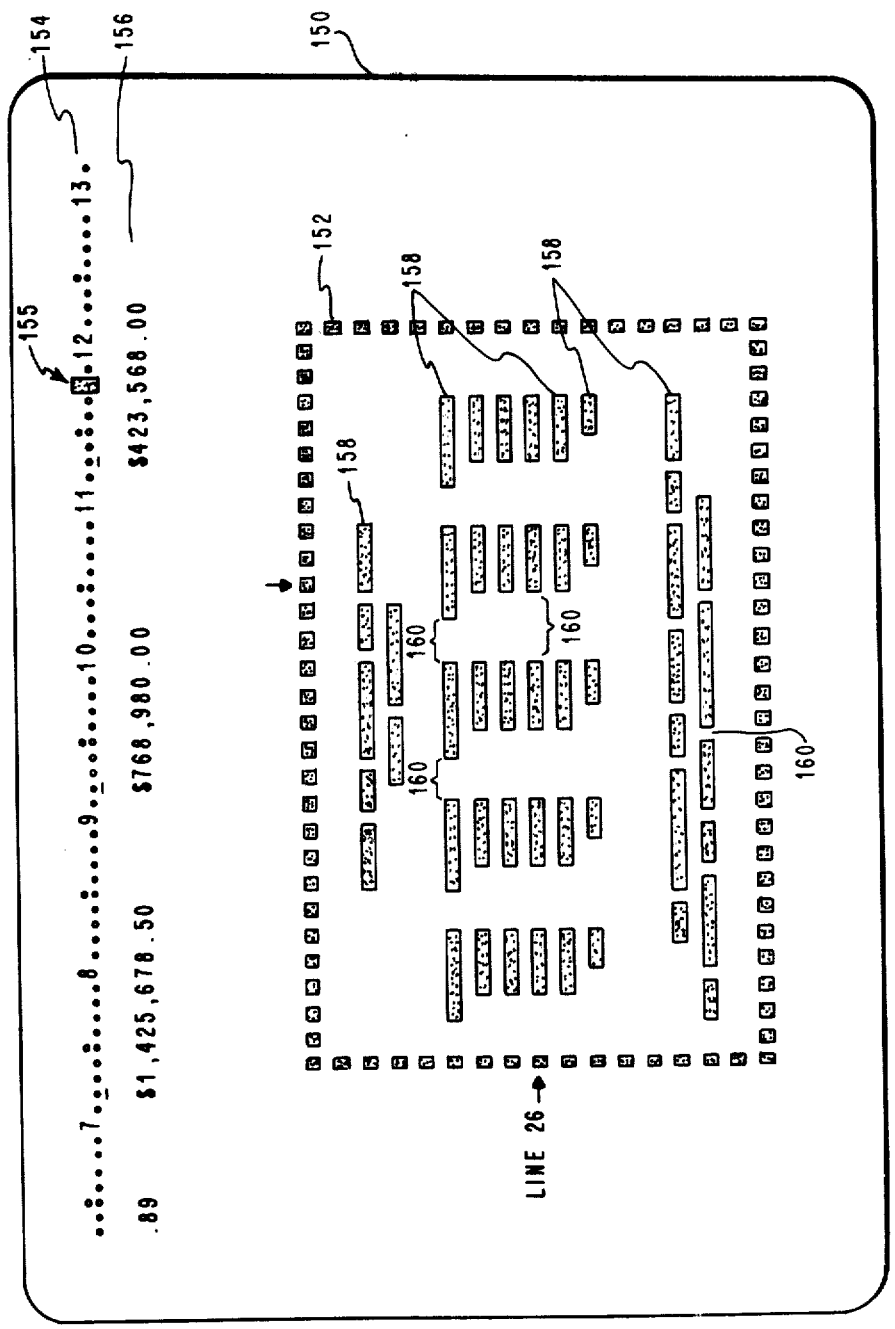
FIG. 3 is a schematic illustration of a display 35 screen showing our invention.

FIG. 3 shows a CRT display screen 150 from a system in which our invention is implemented. Indicated generally at 152 is the outlined miniature full page representation. Scale line 154 includes a cursor 155 to indicate location of the currently active character position. Active line 156, which is the line being entered or altered in the page of text being developed in the system main memory is beneath scale line 154. Full page representation 152 is made proportional to the final printed output. True proportionality to printed pages output in 10 or 12 pitch, for example, additionally requires certain horizontal spacing adjustments. Solid areas 158 represent text placement within a text page. Solid areas 158, spaces 160, and outline 152, are displayed using miniature character representation constructs, which will be described in more detail in connection with FIGS. 4 and 5.

As illustrated in FIG. 3 our invention has particular applicability in systems with a horizontal scrolling feature when preparing extra wide pages. Scale line 154 aids the operator only insofar as position in a single line is concerned. Proportional miniature page representation 152 enhances operator perception of the location of the active line and cursored character relative to the entire page. The manner in which this occurs will become clear as this discussion continues.

Figures 4, 5, 6:
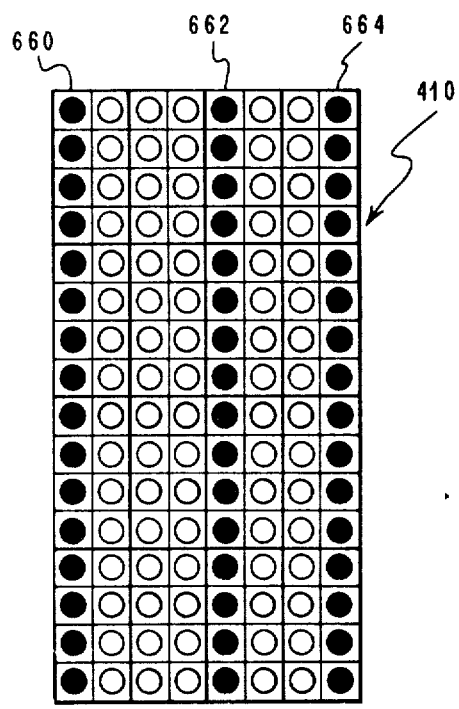
FIG. 4 shows an 8×16 character box.
FIG. 5 illustrates both how the miniature character constructs are related to a single 8×16 character box and how the outline is related to displayed data.
FIG. 6 shows an 8×16 character box with several graphic symbols therein.

FIG. 4 is a schematic illustration of a normal size character box 410 as contemplated in the present invention. In our exemplary embodiment, this character box is 8×16, eight columns wide and 16 rows high. Rows are denoted R1 through R16; and columns, C1 through C8. A conventional CRT using interlaced scanning, as is well known in the art, can display dot matrix characters 8 dots by 16 dots high. Not all of these individual matrix positions are usually used for a given character. A regular character may, for example, be contained in rows 4 through 12 with the unused space being reserved for sub- and superscripts, and/or interline spacing. Columns 2 through 7 may be used for dots, and unused columns for inter-character spacing.

FIG. 5 shows how that same 8×16 matrix 410 can be divided into 16 2×4 miniature character representation boxes. In this manner we are able to display four characters for each of four consecutive lines in the space ordinarily occupied on a CRT screen by a single, normal size character. It is to be especially noted that our miniature display is not a display of characters, but of character representations which enable an operator to comprehend format and spatial relationships on the page being processed.

It is our character representation structure which permits miniature page display with minimal hardware impact. The use of interlaced scanning is advantageously combined with that structure. In interlaced scanning half of the alternating horizontal lines are scanned. These may be referred to as Field 1. The other half of the horizontal lines, alternating with Field 1 lines, are then scanned. These lines are referred to as Field 2. Scan Fields 1 and 2 are interlaced. In FIG. 5, the 16 rows are designated as $\phi$F1, 1F1, 2F1 ... 7F1 or $\phi$F2, 1F2, 2F2 ... 7F2, where F1 and F2 indicate scan Fields 1 and 2, respectively.

We use the convention that 0 is an even number. It can be seen then that the even rows of both Fields 1 and 2 are blank, i.e., not dotted. In each of the 16 separate character representation boxes, these even rows are the topmost two rows. The bottom two rows in each box represent characters or spaces. Boxes like 512 are characters. Those like 514 are spaces.

FIG. 6 shows a character box 410 of the same 8×16 dimensions as that of FIG. 4. Three graphic symbols, 660, 662, and 664, are shown displayed therein. Symbols 660, 662, and 664 are representative of those commonly used to outline portions of a display screen. Of course, only one of the three would appear in a given character box at a given point in time. To attempt to use this prior art technique with a miniature full page representation composed of 2×4 character constructs leads to problems.

The symbol placement indicated at 660 is often used for righthand side outlining. Similarly the symbol placement indicated at 664 is frequently employed for lefthand side outlining. This pair of outlines would be adequate if there were no requirement for proportionality. It may be that to achieve proportionality, a page outline symbol placement as indicated at 662 is needed. Our objective, however, is to provide the operator with a full appreciation of the relationship of a formatted full page of text to page boundaries. To achieve this, the operator must be able to display text right up to the page outline. However, combining miniature character indicators with a symbol such as 662 does not allow this since none of the miniature text representation can be displayed between the left edge of character box 410 and symbol 662.

Refer again to FIG. 5. It is possible with our invention to represent four characters in each of four lines (which may be consecutive lines of text or not) in the space normally occupied by a single character. The rightmost two columns 580 may be used for righthand vertical outline. Dots placed similarly in the leftmost two columns 582 may be used for the left hand vertical outline.

Our technique of generating outlines as all or part of a text representation line gives a proportional page representation in which the text data can be displayed right up to the outline. This can be visualized by referring once again to FIGS. 3 and 5.

The vertical portions of proportional outline 152 in FIG. 3 are the result of displaying a plurality of character representation boxes containing dots such as those shown at 580 in FIG. 5. FIG. 5 could be a part of the right hand vertical portion of a miniature page representation. Similarly, if column 582 of FIG. 5 were configured as column 580, it could form part of the lefthand vertical portion of a miniature page outline.

The four bottommost rows 6F1, 6F2, 7F1, 7F2, of character box 410 of FIG. 5 illustrate the pattern used to display the horizontal portions (top and bottom) of miniature page outline 152 of FIG. 3. Clearly a pattern such as that formed by rows 2F1, 2F2, 3F1 and 3F2 could also be used, if desired.

FIG. 7 describes the actions taken by processor 6 of FIG. 1 for loading refresh memory 18 with the miniature page representation to be displayed. In a conventional manner an operator of a word processing system employing our invention is presented a menu through which to choose several options. The operator is given an opportunity to let the system know what size page and in which orientation it is to be placed. In FIG. 7, a block 700 is the entry point for displaying a miniature page representation. Process block 702 represents the software retrieval of the operator. indicated page width W. Likewise, block 704 represents the system retrieval of the operator designated page height H.

Process block 706 is an illustrative calculation made to determine how many spaces N remain on the display screen to the left of the page size chosen. In the particular application being described the screen width is assumed to be 80 characters wide and 25 lines high. The miniature page is centered on the screen. Obviously, other calculations would be made to accommodate screen of different sizes, or to position the miniature page in a different place on the screen.

At block 708 the miniature page line count, MLC, is initialized to 1. Block 710 represents a software command to load the number of spaces calculated in the previous block into the refresh memory 18 in FIG. 1. It should be obvious to those skilled in the art at this point that the N spaces could be any combination of character symbols and spaces to make up N. It is in this way that we are able to display regular, full size character symbols and text to the left of a miniature page display. This can be seen with reference to FIG. 3 where there is the legend LINE 26 to the left of miniature page outline 152.

Returning now to FIG. 7, it is at block 172 that what we refer to as dynamic mode switching occurs. This will become clearer in the description accompanying FIG. 8. At this point it is sufficient to say that the software loads an indicator to the hardware to switch into the miniature page mode. At process block 714 the miniature page representation character indicators are output. Integral with the output of lines of text representation symbols is the outline 152 (FIG. 3) of the miniature page.

Decision block 716 represents the determination whether the number of miniature lines output, MLC, has reached the limit set by the operator indicated page height H. If not, a determination whether MLC is an integral multiple of 4 is made. If so, four miniature page lines corresponding spatially to one full size text line have been loaded into refresh memory 18 of FIG. 2. MLC is incremented by one and control passes back to block 710. If MLC is not an integral multiple of 4 then MLC is likewise incremented by 1 at block 722 but control returns to block 714 to load another miniature page line into refresh memory 18. When MLC reaches the user set limit, page height H, processing ceases at terminator block 730.

Process block 712 represents formatting in the display refresh memory and subsequent displaying on the CRT of a line of miniature page representations. The line is W spaces wide as determined at block 702. If the miniature line is the horizontal portion of the outline, it is comprised of alternating character representation symbols and spaces to give a dashed appearance as illustrated in FIG. 3.

If the line being formatted in the display refresh memory is not one of the horizontal outline segments, then the first and W'th spaces become a portion of the left and right vertical outline segments, respectively. The result of a plurality of lines so formatted and displayed includes a righthand edge with the appearance illustrated in column 580 of FIG. 5.

It should be clear that when an operator is in a create document mode of operation using a system including our invention, each miniature page line is formatted as all blanks except for the first and Wth spaces. These spaces are formatted to form the vertical page outline. As text is keyed, the given line is reformatted in the display refresh memory.

Once an operator indicates to a word processing system including the compression technique disclosed in our co-pending application Ser. No. 219,666, he is then given an option regarding output page size to which the miniature page display is to be proportional.

The particular display buffer used for refresh memory 18 in FIG. 2 is organized on double byte boundaries, where each byte is eight bits long. Two bytes are used for each normal character. The leftmost 8 bits are used for attributes; the rightmost, actual character data. FIG. 8 shows two such double byte entries generally indicated at 820. The 8 bits used for attribute data are shown in byte 822, and 8 bits of character information are in byte 824. For a given line containing miniature character indicators, however, miniature page attribute data is issued to the system only once for a line. All data thereafter is treated as miniature character representations.

A bit is reserved in the 8 bit byte used for attribute data, to indicate that a switch in mode from full size characters to miniature character indicators is to occur. It will be recalled from the discussion of FIG. 2 that it is this bit from line 200 which sets LATCH 222 for switching the hardware such that data bits from refresh memory 18 bypass character read only storage 76 and are transferred via bus 46 to the miniature page generator 50, and then via bus 90 to shift register 96.

Refer again to FIG. 8. As described earlier with reference to FIGS. 4 and 5, 16 miniature character representations may be indicated or stored in the space in refresh memory 18 normally occupied by the attribute and character information for a single full size character. This is indicated in 8 bit blocks 826 and 828.

Refer once again to FIG. 7 where block 712 indicates the output of miniature page attribute. This function may be better understood when related to FIG. 8. For instance, word 822, the attribute byte, contains, inter alia, the proper bit to signify to the system that a miniature page line is upcoming. While a character could immediately precede miniature page data, it may be desired to have a space preceding the miniature page. Thereafter, the next 16 bits are output from miniature page generator 50 (FIG. 1) as elsewhere described, as 16 2×4 character representations.

In this manner miniature page character indicators are output for the rest of that scan line. During horizontal reset all attributes are reset. Thus, for each scan line the process would be repeated of indicating to the system when it is desired to switch modes. Because the miniature page mode, once indicated in the attribute, is on for the rest of the scan line, no full size character data may be displayed to the right of the miniature page.

OPERATIONS OF THE INVENTION

When the miniature page mode is desired to be entered, a particular bit is set in the attribute byte of the last character space before the miniature page is to be displayed. The system is structured such that when a miniature page mode is entered on a given line, the rest of the line is in miniature page format. Up to that point on the line, full size text may be displayed; however, it will be recalled that in this particular system a full size character is placed in an 8×16 character box and that the character construct used in the miniature page mode is a 2×4 character box. 16 miniature page character representation constructs fit in the space normally occupied by a full size character so that in one full size character box four characters from four lines which will be sequential lines are displayed.

When the data is examined in the main memory 8 of FIG. 1, one bit is stored in the refresh memory 18 for each character, a 0 for each space. A given storage location of 16 bits is arranged so that there are four groups of four bits representing four characters or spaces from four different lines.

Referring again to FIG. 1, the overall block diagram of the display word processing system including our invention, normal data flow when only full size text is to be displayed, is from the main memory 8 to the refresh memory 18. The attribute byte on bus 20 which normally governs such things as cursor, blinking, reverse video, etc., goes to the video control 40; and the data byte on bus 22 is used to access the character generator storage 76 so that the correct code is sent over busses 92 and 94 to parallel to serial converter 96 and then to video control 40. When in the miniature page mode, however, there is but one attribute for the remainder of the line and once that has been detected the hardware is switched so that the path of the attribute data to the video control 40 is blocked and the path of the data bus through the character generator storage 76 is blocked.

Rather, both attribute and data busses 20 and 22 are placed along one bus 46 which goes through the miniature page generator 50 and thence to the parallel to serial converter 96 via busses 90 and 94 and thence to the video control 40. It will be recalled from the discussion of FIG. 2, a more detailed diagram of the miniature page generator, that the one bit stored in the refresh memory 18 for each character or space is doubled for input to output driver block 240 and then output to the parallel data bus 90 which is serialized and sent to the video control for display on the screen.

In conclusion, we have described a technique for providing the user of a word processing system, including a relatively small 80 character wide 25 lines high display screen, the capability of displaying simultaneously with full size character data on three sides, a miniature full page representation. That full page representation is proportional to the desired final hard copy output.

Each line of the miniature page that is displayed has included therewith a portion in the form of a single character indicator of the outline of the page, the dimensions of which are such as to be proportional to the output. In this way, proportionality with hard copy is maintained.

The full size character data displayed to the left of the full page representation, and character indicators which form the miniature full page representation, are displayed using a combination of hardware and software to accomplish dynamic mode switching. As an example, in a vertical scan application regular characters could be displayed above and to the right and left of the miniature page. Also, by selecting the proper scan lines, progressive scan applications can be made.

While the invention has been particularly shown and described with references to a preferred embodiment thereof, it will be understood by those skilled in the art that the above and other changes in form and detail may be made without departing from the spirit and scope of the invention.

What is claimed is:

1. In a word processing system including appropriately interconnected display means, means for producing hard copy output on different size media, and means for displaying on said display means a miniature representation of a full page of text, the improvement comprising:
    means for displaying an outline around said miniature full page representation on said display means, said outline being directly proportional to the size of said hard copy output media.

2. The system of claim 1 further including means for providing on said display means a character indicator which is used to both represent text characters and said page outline.

3. The system of claim 2 in which the means for displaying said outline includes means for determining from user input the media size to be represented.

4. The system of claim 3 in which an outlined miniature full page representation is comprised of symbols displayed in a character box the size of which is an integral fraction of normal character box size.

5. The system of claim 4 in which normal character box is an 8×16 matrix and the miniature symbol is displayed in a 2×4 matrix.

6. In a word processing system including display means, memory means, means for producing hardcopy output on different size media, an improved method of text processing including:
    displaying on said display means a miniature representation of a full page of text; and
    displaying an outline around said miniature full page representations, said outline being made proportional to different size hard copy media.

7. The method of claim 6 including the further step of displaying full size text immediately adjacent said miniature representation.

8. The method of claim 6 or 7 including the step of using the same character indicator for both outlining and representing text.

9. In a text processing system including a display screen, a memory, and printer the improvement comprising:
    means for supporting interactive text editing functions;
    means for displaying on said display screen an outlined miniature full page representation; and
    means for simultaneously displaying full size text immediately adjacent said miniature full page representation.

10. The apparatus of claim 9 further including
    code indicia for determining from user input the page size to be represented and
    code for making said outlined miniature full page representations proportional thereto.

* * * * *

UNITED STATES PATENT AND TRADEMARK OFFICE
CERTIFICATE OF CORRECTION

PATENT NO. : 4,410,958
DATED : 18 October 1983
INVENTOR(S) : K.R. Demke and J.R. Mumola It is certified that error appears in the above–identified patent and that said Letters Patent are hereby corrected as shown below:

Column 7, line 31 delete "172" and insert therefor --712--.

Signed and Sealed this

Third Day of April 1984

[SEAL]

Attest:

GERALD J. MOSSINGHOFF

Attesting Officer

Commissioner of Patents and Trademarks